(12) United States Patent
Iwaya

(10) Patent No.: US 8,586,250 B2
(45) Date of Patent: Nov. 19, 2013

(54) NON-AQUEOUS ELECTROLYTE SOLUTION FOR STORAGE BATTERY DEVICES, AND STORAGE BATTERY DEVICE

(75) Inventor: Masao Iwaya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/412,029

(22) Filed: Mar. 5, 2012

(65) Prior Publication Data

US 2012/0164542 A1   Jun. 28, 2012

Related U.S. Application Data

(63) Continuation of application No. PCT/JP2010/065553, filed on Sep. 9, 2010.

(30) Foreign Application Priority Data

Sep. 11, 2009   (JP) ................................. 2009-210254

(51) Int. Cl.
*H01M 6/16* (2006.01)

(52) U.S. Cl.
USPC ........... 429/335; 429/333; 429/330; 429/341; 429/342; 429/199; 429/200; 429/231.95; 252/62.2

(58) Field of Classification Search
USPC ......... 429/335, 333, 330, 341, 342, 199, 200, 429/231.95; 252/62.2
See application file for complete search history.

(56) References Cited

U.S. PATENT DOCUMENTS

2004/0038133 A1 * 2/2004 Yamaguchi et al. .......... 429/330
2009/0130567 A1   5/2009 Segawa

FOREIGN PATENT DOCUMENTS

| EP | 2 413 418 | 2/2012 |
|---|---|---|
| JP | 09-097627 | 4/1997 |
| JP | 2000-294281 | 10/2000 |
| JP | 2004-319325 | 11/2004 |
| JP | 3807459 | 5/2006 |
| JP | 2007-257875 | 10/2007 |
| JP | 2008-521161 | 6/2008 |
| JP | 2008-176987 | 7/2008 |
| WO | WO 2010/090029 | 8/2010 |

OTHER PUBLICATIONS

International Search Report issued Dec. 14, 2010 in PCT/JP2010/065553 filed Sep. 9, 2010.
Extended European Search Report issued Jul. 18, 2013 in corresponding European Application EP 10815427.

* cited by examiner

*Primary Examiner* — Laura Weiner
(74) *Attorney, Agent, or Firm* — Oblon, Spivak, McClelland, Maier & Neustadt, L.L.P.

(57) ABSTRACT

To provide a non-aqueous electrolyte solution for storage battery devices which has high lithium salt solubility, high conductivity and excellent cycle characteristics, and a storage battery device wherein such a non-aqueous electrolyte solution is used. A non-aqueous electrolyte solution for storage battery devices, which comprises a specific lithium salt (A) and a solvent (B) containing a hydrofluoroether (b1) represented by $CF_3CH_2OCF_2CF_2H$ and a carbonate type solvent (b2), wherein the content of the hydrofluoroether (b1) is from 1 to 30 vol % based on the total amount i.e. 100 vol % of the solvent (B); and a storage battery device wherein such a non-aqueous electrolyte solution for storage battery devices is used.

12 Claims, No Drawings

NON-AQUEOUS ELECTROLYTE SOLUTION FOR STORAGE BATTERY DEVICES, AND STORAGE BATTERY DEVICE

TECHNICAL FIELD

The present invention relates to a non-aqueous electrolyte solution for storage batteries, and a storage battery device.

BACKGROUND ART

A non-aqueous electrolyte solution for storage battery devices contains a high-permittivity solvent such as a carbonate type solvent for good dissolution of an electrolyte salt. The carbonate type solvent is capable of particularly dissolving a lithium salt well to exhibit high lithium-ion conductivity and also has a wide potential window. Thus, the carbonate type solvent is suitably used for lithium-ion secondary batteries, lithium-metal secondary batteries, lithium primary batteries, electric double-layer capacitors, lithium-ion capacitors, and so on. However, when only a high-permittivity solvent such as a carbonate type solvent is used, the charge-discharge cycle life may be short.

So as a non-aqueous electrolyte solution excellent in cycle characteristics, by which storage battery devices having a long charge-discharge cycle life can be obtained, the following non-aqueous electrolyte solutions containing a hydrofluoroether which is excellent in stability to oxidative decomposition have been proposed:

(i) a non-aqueous electrolyte solution using, as the electrolyte solution, a hydrofluoroether represented by H—($CF_2$—$CF_2$)$_a$—$CH_2$—O—$CF_2$—$CF_2$—H, wherein a is 1 or 2 (Patent Document 1);

(ii) a non-aqueous electrolyte solution comprising an acyclic hydrofluoroether which has a fluorination rate of at least 55% and which has at least one of —$CF_2H$ group or —$CFH_2$ group at a terminal of e.g. $HCF_2CF_2CH_2OCF_2CF_2H$ or $CF_3CH_2OCF_2CF_2H$, and an organic solvent having a relative permittivity of at least 10, wherein in the electrolyte solution, the content of the acyclic hydrofluoroether is from 40 to 90 vol %, and the content of the organic solvent is from 5 to 50 vol % (Patent Document 2); and (iii) a non-aqueous electrolyte solution, wherein a hydrofluoroether such as $CF_3CF_2CH_2OCF_2CH_3$ is contained in the electrolyte solution, and the content of the hydrofluoroether is more than 30 vol % and at most 90 vol % (Patent Document 3).

PRIOR ART DOCUMENTS

Patent Documents

Patent Document 1: Japanese Patent No. 3,807,459
Patent Document 2: JP-A-2000-294281
Patent Document 3: JP-A-9-97627

DISCLOSURE OF INVENTION

Technical Problem

However, when the present inventors studied the non-aqueous electrolyte solution (i), they found that the conductivity of the electrolyte solution largely declines by addition of a hydrofluoroether, and the electrolyte solution is of little practical use.

Further, each of the non-aqueous electrolyte solution (ii) and the non-aqueous electrolyte solution (iii) has the conductivity largely declined because of containing a large amount of a hydrofluoroether, and the solubility of a lithium salt such as $LiPF_6$ may not be sufficiently secured particularly under low temperature. Thus, when using a non-aqueous electrolyte solvent containing a carbonate type solvent and a lithium salt, it is difficult to improve the cycle characteristics while the solubility of the lithium salt and the conductivity are sufficiently secured.

An object of the present invention is to provide a non-aqueous electrolyte solution for storage battery devices as represented by a non-aqueous electrolyte solution for lithium-ion secondary batteries, which has high lithium salt solubility, high conductivity and excellent cycle characteristics.

Further, another object of the present invention is to provide storage battery devices as represented by a lithium-ion secondary battery, an electric double-layer capacitor and a lithium-ion capacitor, which have high conductivity and excellent cycle characteristics.

Solution To Problem

The present invention provides the following constructions in order to solve the above problem.

[1] A non-aqueous electrolyte solution for storage battery devices, which comprises at least one lithium salt (A) selected from the group consisting of $LiPF_6$, $LiBF_4$ and $LiClO_4$ and a solvent (B) containing a hydrofluoroether (b1) represented by $CF_3CH_2OCF_2CF_2H$ and a carbonate type solvent (b2), wherein the content of the hydrofluoroether (b1) is from 1 to 30 vol % based on the total amount i.e. 100 vol % of the solvent (B).

[2] The non-aqueous electrolyte solution for storage battery devices according to the above [1], wherein the solvent (B) contains no ether type solvent other than monoethers.

[3] The non-aqueous electrolyte solution for storage battery devices according to the above [1] or [2], wherein the content of the lithium salt (A) is from 0.1 to 3.0 mol per 1 L of the solvent (B).

[4] A non-aqueous electrolyte solution for lithium-ion secondary batteries, which comprises the non-aqueous electrolyte solution for storage battery devices as defined in any one of the above [1] to [3].

[5] A storage battery device which has the non-aqueous electrolyte solution for storage battery devices as defined in any one of the above [1] to [3].

[6] A lithium-ion secondary battery which has a positive electrode which absorbs/desorbs lithium ions, a negative electrode which absorbs/desorbs lithium metal, a lithium alloy or lithium ions, and the non-aqueous electrolyte solution for lithium-ion secondary batteries as defined in the above [4].

[7] An electric double-layer capacitor which has a positive electrode, a negative electrode and the non-aqueous electrolyte solution for storage battery devices as defined in any one of the above [1] to [3], wherein at least one of the positive electrode and the negative electrode is a polarizable electrode.

[8] A lithium-ion capacitor which has a positive electrode, a negative electrode and the non-aqueous electrolyte solution for storage battery devices as defined in any one of the above [1] to [3], wherein at least one of the positive electrode and the negative electrode is a polarizable electrode.

Advantageous Effects of Invention

The non-aqueous electrolyte solution for lithium-ion secondary batteries and the non-aqueous electrolyte solution for storage battery devices of the present invention have high lithium salt solubility, high conductivity and excellent cycle characteristics.

Further, the storage battery devices of the present invention, such as a lithium-ion secondary battery, an electric double-layer capacitor and a lithium-ion capacitor have high conductivity and excellent cycle characteristics.

DESCRIPTION OF EMBODIMENTS

<Non-Aqueous Electrolyte Solution For Storage Battery Devices>

The non-aqueous electrolyte solution for storage battery devices (hereinafter referred to simply as "the non-aqueous electrolyte solution") of the present invention is a non-aqueous electrolyte solution used for storage battery devices such as lithium batteries, electric double-layer capacitors and lithium-ion capacitors. As the lithium batteries, for example, lithium-ion secondary batteries, lithium-metal secondary batteries, lithium-metal primary batteries and lithium-air secondary batteries may be mentioned.

The non-aqueous electrolyte solution of the present invention is preferably used as a non-aqueous electrolyte solution for lithium-ion secondary batteries, non-aqueous electrolyte solution for electric double-layer capacitors or non-aqueous electrolyte solution for lithium-ion capacitors, particularly preferably as a non-aqueous electrolyte solution for lithium-ion secondary batteries.

The non-aqueous electrolyte solution of the present invention is a non-aqueous electrolyte solution comprising at least one lithium salt (A) selected from the group consisting of $LiPF_6$, $LiBF_4$ and $LiClO_4$ and a solvent (B) containing a hydrofluoroether (b1) represented by $CF_3CH_2OCF_2CF_2H$ and a carbonate type solvent (b2). A non-aqueous electrolyte solution means an electrolyte solution which comprises a solvent containing substantially no water, and an electrolyte. That is, a non-aqueous electrolyte solution means an electrolyte solution wherein even if the solvent in the non-aqueous electrolyte solution contains water, the amount of water is at a level where performance degradation of a storage battery device using the non-aqueous electrolyte solution is not observed.

The amount of water contained in the non-aqueous electrolyte solution of the present invention is preferably from 0 to 500 wt ppm, more preferably from 0 to 100 wt ppm, particularly preferably from 0 to 50 wt ppm, based on the total mass of the electrolyte solution.

(Lithium Salt (A))

The lithium salt (A) is at least one lithium salt (A) selected from the group consisting of $LiPF_6$, $LiBF_4$ and $LiClO_4$. The lithium salt (A) is dissociated in the non-aqueous electrolyte solution, whereby high conductivity is imparted to the non-aqueous electrolyte solution of the present invention.

As the lithium salt (A), one or both of $LiPF_6$ and $LiBF_4$ are preferred.

The content of the lithium salt (A) in the non-aqueous electrolyte solution of the present invention is preferably from 0.1 to 3.0 mol, more preferably from 0.5 to 2.0 mol, per 1 L of the solvent (B). When the content of the lithium salt (A) per 1 L of the solvent (B) is at least 0.1 mol, conductivity of the non-aqueous electrolyte solution will be improved. Further, when the content of the lithium salt (A) per 1 L of the solvent (B) is at most 3.0 mol, the lithium salt (A) will be likely to be dissolved in the solvent (B).

(Solvent (B))

The solvent (B) is a solvent containing a specific hydrofluoroether (b1) and a carbonate type solvent (b2). In a case where the solvent (B) contains an ether type solvent other than the hydrofluoroether (b1), the ether type solvent preferably contains no ether type solvent other than monoethers. The monoether means a solvent composed of an ether compound having one ethereal oxygen atom.

The hydrofluoroether (b1) is a monoether represented by $CF_3CH_2OCF_2CF_2H$. Such a compound may, for example, be AE-3000 (tradename, manufactured by Asahi Glass Company, Limited).

The upper limit of the content of the hydrofluoroether (b1) in the non-aqueous electrolyte solution of the present invention is 30 vol % based on 100 vol % of the solvent (B), and the content is preferably at most 25 vol %, more preferably at most 15 vol %. The lower limit of the content is 1 vol %, and the content is preferably at least 5 vol %, more preferably at least 10 vol %. Further, the range of the content is from 1 to 30 vol %, preferably from 5 to 30 vol %, more preferably from 10 to 25 vol %, based on 100 vol % of the solvent (B). From the viewpoint of the conductivity, the range of the content is preferably from 1 to 15 vol %, more preferably from 5 to 15 vol %, further preferably from 10 to 15 vol %. When the content of the hydrofluoroether (b1) is at least 1 vol % based on 100 vol % of the solvent (B), a non-aqueous electrolyte solution having excellent cycle characteristics may be obtained. When the content of the hydrofluoroether (b1) is at most 30 vol % based on 100 vol % of the solvent (B), a non-aqueous electrolyte solution having high solubility of the lithium salt (A) and high conductivity may be obtained.

The carbonate type solvent (b2) may, for example, be a cyclic carbonate or a chain carbonate. As the carbonate type solvent (b2), only one of either cyclic carbonates or chain carbonates may be used, or a mixture of two or more of one or both of cyclic carbonates and chain carbonates may be used. By the carbonate type solvent (b2), the solubility of the lithium salt (A) in the hydrofluoroether (b1) may be improved, and high conductivity may be obtained.

The cyclic carbonate means 1,3-dioxolan-2-one, a 1,3-dioxolan-2-one derivative, 1,3-dioxol-2-one or a 1,3-dioxol-2-one derivative. The derivative means a compound having a halogen atom, an alkyl group or a haloalkyl group in the 4 position or the 5 position, or in each of the 4 position and the 5 position. When the compound has such an atom or a group in each of the 4 position and in the 5 position, they may be the same or different. The halogen atom is preferably a chlorine atom or a fluorine atom, the alkyl group is preferably an alkyl group having at most 4 carbon atoms, and the haloalkyl group is preferably a haloalkyl group having at most 4 carbon atoms and having at least one chlorine atom or fluorine atom.

The chain carbonate means a dialkyl carbonate or a dialkyl carbonate derivative. The two alkyl groups of the dialkyl carbonate may be the same or different, and they preferably have at most 6 carbon atoms. The dialkyl derivative means one having at least one of the two alkyl groups substituted by a haloalkyl group having at most 6 carbon atoms and having at least one chlorine atom or fluorine atom. The alkyl group(s) and the haloalkyl group(s) preferably have at most 4 carbon atoms, further preferably 1 or 2 carbon atoms.

The cyclic carbonate is preferably at least one compound selected from the group consisting of propylene carbonate, ethylene carbonate, butylene carbonate, 4-chloro-1,3-dioxolan-2-one, 4-trifluoromethyl-1,3-dioxolan-2-one, fluoroethylene carbonate, vinylene carbonate and dimethylvinylene carbonate, and from the viewpoint of the availability, the solubility of the lithium salt (A) and the conductivity, it is particularly preferably ethylene carbonate, propylene carbonate, fluoroethylene carbonate or vinylene carbonate.

The chain carbonate is preferably at least one compound selected from the group consisting of dimethyl carbonate, diethyl carbonate, methyl ethyl carbonate, di-n-propyl carbonate, methyl-n-propyl carbonate, ethyl-n-propyl carbonate, methyl isopropyl carbonate, ethyl-n-propyl carbonate, ethyl isopropyl carbonate, di-n-propyl carbonate, diisopropyl carbonate and 3-fluoropropyl methyl carbonate, and from the viewpoint of the availability, the solubility of the lithium salt (A) and the conductivity, it is particularly preferably dimethyl carbonate, diethyl carbonate or methyl ethyl carbonate.

Further, as the carbonate type solvent (b2), a carbonate type solvent having a function as a property-improving additive as described hereinafter, may be used. As the carbonate type solvent having such a function, for example, fluoroethylene carbonate, trifluoropropylene carbonate, phenylethylene carbonate, erythritan carbonate or spiro-bis-dimethylene carbonate may be mentioned. Such a carbonate type solvent having a function as a property-improving additive is preferably used in combination with another carbonate type solvent.

As the carbonate type solvent (b2), a cyclic carbonate is preferred. For example, when charging is carried out with a secondary battery having a non-aqueous electrolyte solution containing a cyclic carbonate, the cyclic carbonate is decomposed on the surface of the negative electrode (e.g. a carbon electrode) to form a stable coating film. The coating film formed by the cyclic carbonate is capable of reducing the resistance at the electrode interface, whereby intercalation of lithium ions to the negative electrode is promoted. That is, the impedance at the negative electrode interface is made small by the coating film formed by the cyclic carbonate in the non-aqueous electrolyte solution, whereby intercalation of lithium ions to the negative electrode is promoted.

Further, as the carbonate type solvent (b2), it is also preferred to use a chain carbonate and a cyclic carbonate in combination. When a cyclic carbonate and a chain carbonate are used in combination as the carbonate type solvent (b2), a solution state of high lithium salt concentration may easily be maintained even at low temperature.

In the case where a chain carbonate and a cyclic carbonate are used in combination as the carbonate type solvent (b2), the volume ratio ($V_1:V_2$) of the chain carbonate (volume: $V_1$) to the cyclic carbonate (volume: $V_2$) is preferably from 1:10 to 10:1. When the content of the cyclic carbonate is within such a range, the melting point of the mixed solvent will be within an appropriate range, and the electrolyte solution having the lithium salt dissolved will become stable. On the other hand, the content of the chain carbonate is within such a range, the solubility of the lithium salt will be within an appropriate range, and the electrolyte solution having the lithium salt dissolved will become stable.

The content of the carbonate type solvent (b2) in the non-aqueous electrolyte solution of the present invention is preferably from 50 to 99 vol %, more preferably from 70 to 90 vol %, based on 100 vol % of the solvent (B). When the content of the carbonate type solvent (b2) is at least 50 vol % based on 100 vol % of the solvent (B), the solubility and the conductivity of the lithium salt (A) will be improved. When the content of the carbonate type solvent (b2) is at most 99 vol % based on 100 vol % of the solvent (B), the cycle characteristics of the non-aqueous electrolyte solution will be improved.

The solvent (B) is preferably a solvent composed of the hydrofluoroether (b1) and the carbonate type solvent (b2), but it may contain another solvent (3b) within a range wherein the non-aqueous electrolyte solution does not undergo phase separation. That is, the solvent (B) may be a solvent composed of the hydrofluoroether (b1), the carbonate type solvent (b2) and another solvent (b3). Further, ether type solvents contained in the solvent (B) other than the hydrofluoroether (b1) preferably contains only monoethers. When the ether type solvents contained in the solvent (B) contains only monoethers, the cycle characteristics of the non-aqueous electrolyte solution may be easily improved. As such another solvent (b3), the following solvent (b31) and solvent (b32) may be mentioned.

Solvent (b31): an ether type solvent other than the hydrofluoroether (b1).

Solvent (b32): an ester type solvent.

The solvent (b31) is a hydrofluoroether and is preferably a hydrofluoroether having one ethereal oxygen atom. The number of carbon atoms of each of the alkyl groups in the hydrofluoroether of the solvent (b31), which are independent of each other, is preferably from 1 to 8, more preferably from 1 to 6, particularly preferably from 1 to 4. Further, the number of carbon atoms of the solvent (b31) is preferably from 3 to 12, more preferably from 4 to 8. When the number of carbon atoms of the solvent (b31) is within such a range, increase in viscosity of the solvent is suppressed, and the conductivity of the electrolyte solution will be good. Further, the boiling point will not become too low, and problems such as gas generation is less likely to occur. Further, from the viewpoint of nonflammability, the fluorination rate (proportion of the total atomic weight of fluorine atoms to the molecular weight of the hydrofluoroether) of the solvent (b31) is preferably at least 50%, particularly preferably at least 55%. Such a hydrofluoroether of solvent (b31) may, for example, be a chain hydrofluoromonoether such as $CHF_2CF_2CH_2OCF_2CF_2H$ or $CF_3CH_2OCF_2CHFCF_3$.

The ester type solvent of the solvent (b32) is a solvent which is a chain ester or a cyclic ester of an acid such as a carboxylic acid, a sulfonic acid, phosphoric acid or nitric acid. The number of carbon atoms of the ester type solvent is preferably from 3 to 12, more preferably from 4 to 8. If the number of carbon atoms of the ester type solvent is fewer than the above, the boiling point tends to be too low, and a storage battery device becomes likely to be expanded by the vapor pressure even under normal use condition of the storage battery device. Further, if the number of carbon atoms of the ester type solvent is more than the above, the viscosity tends to be high, and the conductivity and low-temperature characteristics of the electrolyte may be declined.

The solvent (b32) may, for example, be a carboxylic acid ester such as an alkyl propionate, a dialkyl malonate or an alkyl acetate, a cyclic ester such as γ-butyrolactone, a cyclic sulfonic acid ester such as 1,3-propanesultone or 1,4-butanesultone, an alkyl sulfonate such as methyl methane sulfonate, or an alkyl phosphate.

In the case where such another solvent (b3) is contained, the content of such another solvent (b3) is preferably at most 40 vol %, more preferably at most 30 vol %, particularly preferably at most 20 vol %, based on 100 vol % of the solvent (B).

(Other Components (C))

Further, the non-aqueous electrolyte solution of the present invention may contain, as the case requires, components (C) other than the lithium salt (A) and the solvent (B) to improve the functions of the electrolyte solution. Such other components (C) include, for example, a conventional overcharge-preventing agent, a dehydrating agent, a deoxidizing agent, and a property-improving additive to improve the cycle characteristics and the capacity-maintaining property after storage at high temperature.

The overcharge-preventing agent may, for example, be an aromatic compound such as biphenyl, an alkyl biphenyl, terphenyl, a partially hydrogenated terphenyl, cyclohexylbenzene, t-butylbenzene, t-amylbenzene, diphenyl ether or dibenzofuran; a partially fluorinated product of the above aromatic compound, such as 2-fluorobiphenyl, o-cyclohexylfluorobenzene or p-cyclohexylfluorobenzene; or a fluorinated anisole compound such as 2,4-difluoroanisole, 2,5-difluoroanisole or 2,6-difluoroanisole. One of such overcharge-preventing agents may be used alone, or two or more of them may be used in combination.

In the case where the non-aqueous electrolyte solution of the present invention contains an overcharge-preventing agent, the content of the overcharge-preventing agent in the non-aqueous electrolyte solution (100 wt %) is preferably from 0.1 to 5 wt %. If the content of the overcharge-preventing agent in the non-aqueous electrolyte solution is at least 0.1 wt %, when the non-aqueous electrolyte solution of the present invention is used for a secondary battery, it is easy to prevent rapture or ignition of the secondary battery by overcharge, and it is possible to use the secondary battery more stably.

The dehydrating agent may, for example, be molecular sieves, sodium sulfate, magnesium sulfate, calcium hydride, sodium hydride, potassium hydride or lithium aluminum hydride. As the solvent (B) to be used for the non-aqueous electrolyte solution of the present invention, it is preferred to use one which has been dehydrated by means of the above dehydrating agent, followed by rectification. Otherwise, the solvent (B) which has been dehydrated by means of the above dehydrating agent, without carrying out rectification, may also be used.

The property-improving additive may, for example, be a carboxylic acid anhydride such as succinic anhydride, glutaric anhydride, maleic anhydride, citraconic anhydride, glutaconic anhydride, itaconic anhydride, diglycolic anhydride, cyclohexanedicarboxylic acid anhydride, cyclopentanetetracarboxylic acid dianhydride or phenylsuccinic anhydride; a sulfur-containing compound such as ethylene sulfite, busulfan, sulfolane, sulfolene, dimethyl sulfone, diphenyl sulfone, methylphenyl sulfone, dibutyl disulfide, dicyclohexyl disulfide, tetramethylthiuram monosulfide, N,N-dimethylmethanesulfonamide or N,N-diethylmethanesulfonamide; a nitrogen-containing compound such as 1-methyl-2-pyrrolidinone, 1-methyl-2-piperidone, 3-methyl-2-oxazolidinone, 1,3-dimethyl-2-imidazolidinone or N-methylsuccinimide; a hydrocarbon such as heptane, octane or cycloheptane; or a fluorinated aromatic compound such as fluorobenzene, difluorobenzene, hexafluorobenzene or benzotrifluoride. One of these property-improving additives may be used alone, or two or more of them may be used in combination.

In the case where the non-aqueous electrolyte solution of the present invention contains the property-improving additive, the content of the property-improving additive in the non-aqueous electrolyte solution (100 wt %) is preferably from 0.1 to 5 wt %.

The non-aqueous electrolyte solution of the present invention preferably has a conductivity at $-15°$ C. of at least 0.20 $S \cdot m^{-1}$ with a view to practical use of storage battery devices such as secondary batteries. The conductivity is normally increased with increase in temperature, and the conductivity at $15°$ C. is preferably at least 0.62 $S \cdot m^{-1}$. Further, the viscosity ($20°$ C.) of the non-aqueous electrolyte solution measured by a rotary viscometer is preferably from 0.1 to 20 cP.

The non-aqueous electrolyte solution of the present invention is preferably an electrolyte solution, of which the potential range (potential window) where the electrolytic current value reaches 0.05 $mA/cm^2$ is a range wider than a range of from 0.2 V to 4.2 V. The value for such a potential window is a value represented by the potential based on the lithium metal. The measurement of the potential window can be carried out by the method which will be described in Examples.

In the non-aqueous electrolyte solution of the present invention, the solvent (B) containing the carbonate type solvent (b2) and having a small amount of the hydrofluoroether (b1) added thereto is used, whereby excellent cycle characteristics of charge/discharge at a charging voltage of higher than 4.2 V may be obtained while important properties as a storage battery such as solubility of the lithium salt (A) and conductivity are maintained, although the reason is not clear. Further, the non-aqueous electrolyte solution of the present invention contains the hydrofluoroether (b1), whereby it has excellent oxidation resistance.

<Storage Battery Device>

The storage battery device of the present invention is a storage battery device having the non-aqueous electrolyte solution of the present invention. Such storage battery devices include, for example, a secondary battery such as a lithium-ion secondary battery, a primary battery, an electric double-layer capacitor, and a lithium-ion capacitor.

As the storage battery device of the present invention, a lithium-ion secondary battery, an electric double-layer capacitor or a lithium-ion capacitor is preferred, and a lithium-ion secondary battery is particularly preferred.

[Lithium-Ion Secondary Battery]

The lithium-ion secondary battery of the present invention (hereinafter referred to as "the present secondary battery") is a secondary battery having a negative electrode and a positive electrode, and the non-aqueous electrolyte solution for lithium-ion secondary batteries of the present invention.

The negative electrode may be an electrode containing a negative electrode active material capable of electrochemically absorbing/desorbing lithium ions. As the negative electrode active material, a known negative electrode active material for lithium-ion secondary batteries may be used. For example, a carbon material such as graphite or amorphous carbon, a metal such as metal lithium or a lithium alloy, or a metal compound, capable of absorbing/desorbing lithium ions may be mentioned. One of these negative electrode active materials may be used alone, or two or more of them may be used in combination.

Among them, a carbon material is particularly preferred as the negative electrode active material. Further, as the carbon material, graphite or a carbon material having the surface of graphite covered with carbon which is amorphous as compared with the graphite, is particularly preferred.

The graphite is preferably such that the value d (interlayer distance, hereinafter referred to simply as "the value d") of the lattice plane (002 plane) obtained by the X-ray diffraction by the method of the Japan Society for Promotion of Scientific Research is from 0.335 to 0.338 nm, more preferably from 0.335 to 0.337 nm. Further, the crystallite size (Lc) obtained by the X-ray diffraction by the method of the Japan Society for Promotion of Scientific Research is preferably at least 30 nm, more preferably at least 50 nm, further preferably at least 100 nm. The ash content of the graphite is preferably at most 1 wt %, more preferably at most 0.5 wt %, further preferably at most 0.1 wt %.

Further, the carbon material having the surface of graphite covered with amorphous carbon is preferably such that graphite having a value d of from 0.335 to 0.338 nm is used as a nucleus, and the surface of the graphite is covered with amorphous carbon having a value d larger than the graphite, and the ratio of the graphite (mass: $W_A$) as the nucleus to the amorphous carbon (mass: $W_B$) covering the graphite is preferably from 80/20 to 99/1 by mass ratio ($W_A/W_B$). By using such a carbon material, it becomes easy to produce a negative electrode which has a high capacity and is hardly reactive with the electrolyte solution.

The particle size of the carbon material is preferably at least 1 μm, more preferably at least 3 μm, further preferably at least 5 μm, particularly preferably at least 7 μm, by a median diameter by a laser diffraction/scattering method. Further, the particle size of the carbon material is preferably at most 100 μm, more preferably at most 50 μm, further preferably at most 40 μm, particularly preferably at most 30 μm.

The specific surface area of the carbon material by BET method is preferably at least 0.3 m$^2$/g, more preferably at least 0.5 m$^2$/g, further preferably at least 0.7 m$^2$/g, particularly preferably at least 0.8 m$^2$/g. The specific surface area of the carbon material is preferably at most 25.0 m$^2$/g, more preferably at most 20.0 m$^2$/g, further preferably at most 15.0 m$^2$/g, particularly preferably at most 10.0 m$^2$/g.

The carbon material preferably has a value R(=$I_B/I_A$) of from 0.01 to 0.7, which is represented by a ratio of the peak intensity $I_B$ of a peak $P_B$ within a range of from 1,300 to 1,400 cm$^{-1}$ to the peak intensity $I_A$ of a peak $P_A$ within a range of from 1,570 to 1,620 cm$^{-1}$ when the carbon material is analyzed by the Raman spectrum using an argon ion laser beam. Further, the half value width of the peak $P_A$ is preferably at most 26 cm$^{-1}$, particularly preferably at most 25 cm$^{-1}$.

The metal useful as a negative electrode active material other than metal lithium, may, for example, be Ag, Zn, Al, Ga, In, Si, Ti, Ge, Sn, Pb, P, Sb, Bi, Cu, Ni, Sr or Ba. Further, the lithium alloy may, for example, be an alloy of lithium with the above metal. Further, the metal compound may, for example, be an oxide of the above metal.

Among them, at least one metal selected from the group consisting of Si, Sn, Ge, Ti and Al, or a metal compound, metal oxide or a lithium alloy containing such a metal, is preferred. At least one metal selected from the group consisting of Si, Sn and Al, a metal compound or a lithium alloy containing such a metal, or lithium titanate is more preferred.

The metal capable of absorbing/desorbing lithium ions, or the metal compound or the lithium alloy containing such a metal, usually has a large capacity per unit mass, as compared with the carbon material represented by graphite, and thus, it is suitable for a secondary battery which is required to have a higher energy density.

The positive electrode may be an electrode containing a positive electrode active material which is capable of electrochemically absorbing/desorbing lithium ions.

As such a positive electrode active material, a known positive electrode active material for lithium-ion secondary batteries may be used. For example, a lithium-containing transition metal oxide such as lithium cobalt oxide, lithium nickel oxide or lithium manganese oxide, a lithium-containing transition metal composite oxide using at least one transition metal, a transition metal oxide, a transition metal sulfide, a metal oxide or an olivine type metal lithium salt may be mentioned.

The transition metal of the lithium-containing transition metal composite oxide is preferably, for example, V, Ti, Cr, Mn, Fe, Co, Ni or Cu, and such a lithium-containing transition metal composite oxide may, for example, be a lithium-cobalt composite oxide such as LiCoO$_2$, a lithium-nickel composite oxide such as LiNiO$_2$, a lithium-manganese composite oxide such as LiMnO$_2$, LiMn$_2$O$_4$ or LiMnO$_3$, and one having a part of transition metal atoms which are the main component of such a lithium transition metal composite oxide substituted by another metal such as Al, Ti, V, Cr, Mn, Fe, Co, Li, Ni, Cu, Zn, Mg, Ga, Zr, Si or Yb. As such one having a substitute metal, LiMn$_{0.5}$Ni$_{0.5}$O$_2$, LiMn$_{1.8}$Al$_{0.2}$O$_4$, LiNi$_{0.85}$Co$_{0.10}$Al$_{0.05}$O$_2$, LiMn$_{1.5}$Ni$_{0.5}$O$_4$, LiNi$_{1/3}$Co$_{1/3}$Mn$_{1/3}$O$_2$ or LiMn$_{1.8}$Al$_{0.2}$O$_4$ may be mentioned.

As the transition metal oxide, TiO$_2$, MnO$_2$, MoO$_3$, V$_2$O$_5$ or V$_6$O$_{13}$, as the transition metal sulfide, TiS$_2$, FeS or MoS$_2$, and as the metal oxide, SnO$_2$ or SiO$_2$, may, for example, be mentioned.

The olivine type metal lithium salt is a substance represented by Li$_L$X$_x$Y$_y$O$_z$F$_g$ wherein X is Fe (II), Co (II), Mn (II), Ni (II), V (II) or Cu (II), Y is P or Si and L, x, y, z and g are numbers which satisfy 0≤L≤3, 1≤x≤2, 1≤y≤3, 4≤z≤12 and 0≤g≤1, respectively, or a complex thereof. For example, LiFePO$_4$, Li$_3$Fe$_2$(PO$_4$)$_3$, LiFeP$_2$O$_7$, LiMnPO$_4$, LiNiPO$_4$, LiCoPO$_4$, Li$_2$FePO$_4$F, Li$_2$MnPO$_4$F, Li$_2$NiPO$_4$F, Li$_2$CoPO$_4$F, Li$_2$FeSiO$_4$, Li$_2$MnSiO$_4$, Li$_2$NiSiO$_4$ or Li$_2$CoSiO$_4$ may be mentioned.

One of these positive electrode active materials may be used alone, or two or more of them may be used in combination.

Further, such a positive electrode active material having on its surface attached substance having a composition different from the substance constituting the positive electrode active material as the main component may also be used. The surface-attached substance may, for example, be an oxide such as aluminum oxide, silicon oxide, titanium oxide, zirconium oxide, magnesium oxide, calcium oxide, boron oxide, antimony oxide or bismuth oxide; a sulfate such as lithium sulfate, sodium sulfate, potassium sulfate, magnesium sulfate, calcium sulfate or aluminum sulfate; or a carbonate such as lithium carbonate, calcium carbonate or magnesium carbonate.

With regard to the amount of the surface-attached substance, the lower limit of the mass based on the positive electrode active material is preferably 0.1 ppm, more preferably 1 ppm, further preferably 10 ppm. The upper limit is preferably 20 wt %, more preferably 10 wt %, further preferably 5 wt %. By the surface-attached substance, it is possible to suppress an oxidation reaction of the non-aqueous electrolyte solution at the surface of the positive electrode active material, and thereby to improve the battery life.

As the positive electrode active material, a lithium-containing composite oxide having an α-NaCrO$_2$ structure as a matrix, such as LiCoO$_2$, LiNiO$_2$ or LiMnO$_2$, or a lithium-containing composite oxide having a spinel type structure as a matrix, such as LiMn$_2$O$_4$, is preferred from such a viewpoint that the discharge voltage is high, and the electrochemical stability is high.

For the preparation for an electrode, a binder to bind the negative electrode active material or the positive electrode active material is used.

As such a binder to bind the negative electrode active material or the positive electrode active material, an optional binder may be used so long as it is a material stable against the electrolyte solution and the solvent to be used at the time of producing the electrodes. The binder may, for example, be a fluororesin such as polyvinylidene fluoride or polytetrafluoroethylene, a polyolefin such as polyethylene or polypropylene, a polymer having unsaturated bonds such as a styrene/butadiene rubber, isoprene rubber or butadiene rubber, or an acrylic acid type polymer such as an acrylic acid copolymer or a methacrylic acid copolymer. One of these binders may be used alone, or two or more of them may be used in combination.

In order to increase the mechanical strength and electrical conductivity, a thickener, an electrically conductive material, a filler or the like may be incorporated in the electrode.

The thickener may, for example, be carboxymethylcellulose, methylcellulose, hydroxymethylcellulose, ethylcellulose, polyvinyl alcohol, oxidized starch, phosphorylated starch, casein or polyvinylpyrrolidone. One of these thickeners may be used alone, or two or more of them may be used in combination.

The electrically conductive material may, for example, be a metal material such as copper or nickel, or a carbon material such as graphite or carbon black. One of these electrically conductive materials may be used alone, or two or more of them may be used in combination.

An electrode can be prepared by adding a binder, a thickener, an electrically conductive material, a solvent, etc. to a negative electrode active material or a positive electrode active material, to form a slurry, which is then applied to a current collector, followed by drying. In such a case, the electrode is preferably pressed and densified by pressing after the drying.

If the density of the positive electrode active material layer is too low, the capacity of the secondary battery is likely to be inadequate.

As the current collector, various type of current collector may be used. However, usually a metal or an alloy is employed. As a current collector for a negative electrode, copper, nickel, stainless steel or the like may be mentioned, and copper is preferred. Whereas, as a current collector for a positive electrode, a metal such as aluminum, titanium or tantalum, or its alloy may be mentioned, and aluminum or its alloy is preferred, and aluminum is particularly preferred.

The shape of the present secondary battery may be selected depending upon the particular application, and it may be a coin-form, a cylindrical form, a square form or a laminate-form. Further, the shapes of the positive electrode and the negative electrode may also be suitably selected to meet with the shape of the present secondary battery.

The charging voltage of the present secondary battery is preferably set to be at least 3.4 V, more preferably at least 4.0 V, particularly preferably at least 4.2 V. In a case where the positive electrode active material of the present secondary battery is a lithium-containing transition metal oxide, a lithium-containing transition metal composite oxide, a transition metal oxide, a transition metal sulfide or a metal oxide, the charging voltage is preferably at least 4.0 V, particularly preferably 4.2 V. Further, in a case where the positive electrode active material is an olivine type metal lithium salt, the charging voltage is preferably at least 3.2 V, particularly preferably at least 3.4 V. The non-aqueous electrolyte solution for lithium-ion secondary batteries of the present invention has oxidation resistance of at least 4.2 V and reduction resistance of at most 0.2 V, and thus it may be used for any electrodes having an operating potential within such a range.

Further, the present secondary battery is particularly preferably a secondary battery which is used at a charging voltage of at least 4.2 V (the potential based on lithium metal). For example, it may be a secondary battery having the non-aqueous electrolyte solution for lithium-ion secondary batteries of the present invention which has a potential window wider than the range of from 0 V to 4.2 V.

Between the positive electrode and the negative electrode of the present secondary battery, a porous film is usually interposed as a separator in order to prevent short circuiting. In such a case, the non-aqueous electrolyte solution with which the porous film is impregnated is used. The material and the shape of the porous film are not particularly limited so long as it is stable against the non-aqueous electrolyte solution and is excellent in the liquid-maintaining property. The material of the porous film is preferably a fluororesin such as polyvinylidene fluoride, polytetrafluoroethylene or a copolymer of ethylene and tetrafluoroethylene, or a polyolefin such as polyethylene or polypropylene. Among them, a polyolefin such as polyethylene or polypropylene is more preferred. Further, the shape of the porous film is preferably a porous sheet or a nonwoven fabric. Further, such a porous film impregnated with the non-aqueous electrolyte solution and gelated may be used as a gel electrolyte.

The material for a battery exterior package to be used for the present secondary battery may be a material which is commonly used for secondary batteries, and nickel-plated iron, stainless steel, aluminum or its alloy, nickel, titanium, a resin material, or a film material may, for example, be mentioned.

The lithium-ion secondary battery of the present invention as described above uses the non-aqueous electrolyte solution, and thus has a high conductivity and excellent cycle characteristics.

The non-aqueous electrolyte solution for storage battery devices of the present invention is used for the above lithium-ion secondary battery, and it may also be used for secondary batteries such as a lithium-metal secondary battery, a lithium-ion secondary battery and a lithium-air secondary battery, and primary batteries such as a lithium primary battery.

[Electric Double-Layer Capacitor]

The electric double-layer capacitor of the present invention has a negative electrode and a positive electrode, at least one of which is a polarizable electrode, and the above non-aqueous electrolyte solution of the present invention. That is, the electric double-layer capacitor of the present invention has the same construction as publicly known electric double-layer capacitors except that the non-aqueous electrolyte solution of the present invention is used.

The polarizable electrode is preferably an electrode composed mainly of an electrochemically inactive material having a large specific surface area, and is more preferably an electrode composed of activated carbon, carbon black, metal fine particles or conductive oxide fine particles. Among them, an electrode having formed an electrode layer having a large specific surface area wherein the surface of the metal current collector is made of a carbon material powder such as activated carbon is particularly preferred.

[Lithium-Ion Capacitor]

The lithium-ion capacitor of the present invention has a negative electrode and a positive electrode, at least one of which is a polarizable electrode, and the above non-aqueous electrolyte solution of the present invention. That is, the lithium-ion capacitor of the present invention has the same construction as publicly known lithium-ion capacitors except that the non-aqueous electrolyte solution of the present invention is used. As the polarizable electrode, the same electrode as the one mentioned for the above electric double-layer capacitor may be used.

The storage battery device of the present invention as described above uses the non-aqueous electrolyte solution of the present invention, and thus has a high conductivity and excellent cycle characteristics.

Thus, the storage battery device of the present invention may be used for various applications to, for example, mobile phones, portable game devices, digital cameras, digital video cameras, electric tools, notebook computers, portable information terminals, portable music players, electric vehicles, hybrid automobiles, electric trains, aircrafts, artificial satellites, submarines, ships, uninterruptible power supply systems, robots, electric power storage systems, and so on.

EXAMPLES

Now, the present invention will be described in detail with reference to working Examples and Comparative Examples.

However, it should be understood that the present invention is by no means restricted to these Examples.

Preparation Example 1

Preparation of Carbonate Type Solvent (b2-1)

Ethylmethyl carbonate and ethylene carbonate were mixed in a ratio of 1/1 (by volume) to prepare carbonate type solvent (b2-1).

Preparation Example 2

Preparation of solvent (B-1)

The carbonate type solvent (b2-1) obtained in Preparation Example 1 and a hydrofluoroether (b1) ($CF_3CH_2OCF_2CF_2H$) were mixed in a ratio of 85/15 (by volume) to prepare solvent (B-1).

Preparation Example 3

Preparation of Solvent (B-2)

The carbonate type solvent (b2-1) obtained in Preparation Example 1 and the hydrofluoroether (b1) were mixed in a ratio of 75/25 (by volume) to prepare solvent (B-2).

Preparation Example 4

Preparation of Solvent (B'-1)

The carbonate type solvent (b2-1) obtained in Preparation Example 1 and the hydrofluoroether (b1) were mixed in a ratio of 50/50 (by volume) to prepare solvent (B'-1).

<Evaluation of Solubility>

Examples 1 And 2

In each of the solvent (B-1) and the solvent (B-2) prepared in Preparation Examples 2 and 3, respectively, $LiPF_6$ was dissolved until saturation, and the saturation solubility was evaluated.

Comparative Example 1

In the solvent (B'-1) prepared in Preparation Example 4, $LiPF_6$ was dissolved until saturation, and the saturation solubility was evaluated.

Reference Example 1

In the carbonate type solvent (b2-1) prepared in Preparation Example 1, $LiPF_6$ was dissolved until saturation, and the saturation solubility was evaluated.

The results of the saturation solubility of $LiPF_6$ in each Example are shown in Table 1. The $LiPF_6$ saturation solubility is evaluated as having no practical problem when it is at least 1 mol/L. "Content of (b1)" in Table 1 means the content of the hydrofluoroether (b1) based on the total amount i.e. 100 vol % of the solvent (B).

TABLE 1

| | Solvent | | |
|---|---|---|---|
| | Type | Content of (b1) (vol %) | $LiPF_6$ saturation solubility (mol/L) |
| Ex. 1 | B-1 | 15 | >1.2 |
| Ex. 2 | B-2 | 25 | >1.2 |
| Comp. Ex. 1 | B'-1 | 50 | 0.6 |
| Ref. Ex. 1 | b2-1 | 0 | >1.2 |

As shown in Table 1, in Examples 1 and 2 of the present invention, wherein the content of the hydrofluoroether (b1) is from 1 to 30 vol % based on the total amount i.e. 100 vol % of the solvent (B), an effect such that the solubility of the lithium salt is high was obtained.

On the other hand, in Comparative Example 1, which is a Comparative Example of the present invention, the saturation solubility of the lithium salt largely declined.

Reference Example 1 is an Example wherein only the carbonate type solvent (b2) was used without using the hydrofluoroether (b1). In Examples 1 and 2, the $LiPF_6$ saturation solubility at the same level as in Reference Example 1 was obtained.

<Evaluation of Conductivity>

Example 3

In the solvent (B-1) prepared in Preparation Example 2, $LiPF_6$ was dissolved at a concentration of 1 mol/L to prepare non-aqueous electrolyte solution 1, and the conductivity was evaluated.

Example 4

In the solvent (B-2) prepared in Preparation Example 3, $LiPF_6$ was dissolved at a concentration of 1 mol/L to prepare non-aqueous electrolyte solution 2, and the conductivity was evaluated.

[Evaluation Method of Conductivity]

Measurement of the non-aqueous electrolyte solution was carried out at −15° C. and 15° C. by means of an electrical conductivity meter (glass electrode type hydrogen ion concentration meter WM-22EP, manufactured by DKK-TOA Corporation).

The evaluation results are shown in Table 2.

TABLE 2

| | Electrolyte solution | | Conductivity (S/m) | |
|---|---|---|---|---|
| | Type | Solvent | −15° C. | 15° C. |
| Ex. 3 | Non-aqueous electrolyte solution 1 | B-1 | 0.25 | 0.71 |
| Ex. 4 | Non-aqueous electrolyte solution 2 | B-2 | 0.27 | 0.65 |

As shown in Table 2, in Examples 3 and 4 of the present invention, wherein the content of the hydrofluoroether (b1) is from 1 to 30 vol % based on the total amount i.e. 100 vol % of the solvent (B), an effect such that a practically sufficient conductivity is exhibited was obtained.

<Evaluation of Cycle Characteristics>

Example 5

$LiCoO_2$ (tradename: "Selion C" manufactured by AGC Seimi Chemical Co., Ltd., 90 parts by mass), carbon black (tradename: "DENKABLACK" manufactured by Denki Kagaku Kogyo Kabushiki Kaisha, 5 parts by mass) and polyvinylidene fluoride (5 parts by mass) were mixed, and N-methyl-2-pyrrolidone was added thereto to obtain a slurry. The slurry was uniformly applied and dried on both sides of an aluminum foil having a thickness of 20 μm, followed by pressing so that the density of a positive electrode active material layer would be 3.0 g/cm$^3$, thereby to prepare a LiCoO$_2$ positive electrode.

The above LiCoO$_2$ positive electrode, a lithium metal foil having the same area as the LiCoO$_2$ positive electrode and a separator made of polyethylene were laminated in the order of the lithium metal foil, the separator and the LiCoO$_2$ positive electrode to prepare a battery element. Then, in a bag made of a laminate film having each side of aluminum (thickness: 40 μm) covered by a resin layer (polyethylene resin), the above battery element was accommodated so that terminals of the LiCoO$_2$ positive electrode and negative electrode (lithium metal foil) of the battery element extended out of the bag.

Then, the non-aqueous electrolyte solution 1 prepared as described above, was injected into the bag, followed by vacuum sealing to prepare a sheet-form secondary battery 1 (a lithium-ion battery).

Example 6

Secondary battery 2 was prepared in the same manner as in Example 5 except that the non-aqueous electrolyte solution 2 was used instead of the non-aqueous electrolyte solution 1.

Reference Example 2

In the carbonate type solvent (b2-1) prepared in Preparation Example 1, LiPF$_6$ was dissolved at a concentration of 1 mol/L to prepare non-aqueous electrolyte solution 3.

Then, secondary battery 3 was prepared in the same manner as in Example 5 except that the non-aqueous electrolyte solution 3 was used instead of the non-aqueous electrolyte solution 1.

[Evaluation Method of Cycle Characteristics]

With a monopolar cell sheet-form lithium-ion secondary battery comprising LiCoO$_2$ positive electrode/lithium metal foil in a state of being sandwiched by glass plates in order to increase adhesion between electrodes, a cycle of charging it to 4.2 V with a constant current corresponding to 0.2 C and then discharging it to 3 V with a constant current corresponding 0.2 C was carried out at 25° C. for 5 cycles to stabilize the secondary battery. In the 6th and subsequent cycles, a cycle of charging it to 4.5 V with a constant current of 0.2 C and further charging it with a constant voltage of 4.5 V until the current value became 0.02 C and then discharging it to 3 V with a constant current of 0.2 C, was repeated, whereupon a retention rate of the discharged capacity in the 50th cycle to the discharged capacity in the first cycle of charging with a voltage of 4.5 V (6th cycle) was taken as the evaluation result. Here, 1 C represents a current value to discharge the standard capacity of a battery in one hour, and 0.2 C represents a current value of 1/5 thereof.

The results of the evaluation of cycle characteristics in each Example are shown in Table 3.

TABLE 3

| Secondary battery | Electrolyte solution | | Retention rate of discharged capacity (%) |
|---|---|---|---|
| | Type | Solvent | |
| Ex. 5 | Secondary battery 1 | Non-aqueous electrolyte solution 1 | B-1 | 81 |
| Ex. 6 | Secondary battery 2 | Non-aqueous electrolyte solution 2 | B-2 | 86 |
| Ref. Ex. 2 | Secondary battery 3 | Non-aqueous electrolyte solution 3 | b2-1 | 79 |

As shown in Table 3, in Examples 5 and 6 of the present invention, wherein the content of the hydrofluoroether (b1) is from 1 to 30 vol % based on the total amount i.e. 100 vol % of the solvent (B), excellent cycle characteristics were obtained.

Reference Example 2 is an Example of a secondary battery having a non-aqueous electrolyte solution wherein only the carbonate type solvent (b2) was used and the hydrofluoroether (b1) was not used. In Examples 5 and 6, cycle characteristics equivalent to or better than the secondary battery 3 of Reference Example 2 were obtained.

As described above, the non-aqueous electrolyte solution of the present invention uses a small amount of the hydrofluoroether (b1), whereby it is possible to improve charge/discharge cycle characteristics with a charging voltage exceeding 4.2 V while battery characteristics such as solubility of a lithium salt and conductivity are maintained at a high level. The storage battery devices of the present invention as represented by a lithium-ion secondary battery thereby have practically sufficient conductivity and excellent cycle characteristics.

INDUSTRIAL APPLICABILITY

The non-aqueous electrolyte solution for storage battery devices of the present invention is useful as an electrolyte solution containing no water, which is used for storage battery devices such as lithium-ion secondary batteries.

This application is a continuation of PCT Application No. PCT/JP2010/065553, filed Sep. 9, 2010, which is based upon and claims the benefit of priority from Japanese Patent Application No. 2009-210254 filed on Sep. 11, 2009. The contents of those applications are incorporated herein by reference in its entirety.

What is claimed is:

1. A non-aqueous electrolyte solution which comprises:
   at least one lithium salt (A) selected from the group consisting of LiPF$_6$, LiBF$_4$ and LiClO$_4$;
   a solvent (B) comprising a hydrofluoroether (b1) represented by CF$_3$CH$_2$OCF$_2$CF$_2$H and a carbonate solvent (b2); and
   an overcharge-preventing agent in an amount of from 0.1 to 5 wt % based on a total amount of the non-aqueous electrolyte solution,
   wherein the hydrofluoroether (1) is included in an amount of from 1 to 30 vol % based on a total amount of the solvent (B), and
   the overcharge-preventing agent comprises at least one of biphenyl, an alkyl biphenyl, terphenyl, a partially hydrogenated terphenyl, cyclohexylbenzene, t-butylbenzene, t-amylbenzene, diphenyl ether, dibenzofuran, 2-fluorobiphenyl, o-cyclohexylfluorobenzene, p-cyclohexylfluorobenzene, 2,4-difluoroanisole, 2,5-difluoroanisole and 2,6-difluoroanisole.

2. The non-aqueous electrolyte solution according to claim 1, wherein the solvent (B) further comprises CF$_3$CH$_2$OCF$_2$CHFCF$_3$.

3. The non-aqueous electrolyte solution according to claim 1, wherein the lithium salt (A) is included in an amount of from 0.1 to 3.0 mol per 1 L of the solvent (B).

4. A storage battery device comprising:
   the non-aqueous electrolyte solution as defined in claim 1.

5. A lithium-ion secondary battery which comprises:
   a positive electrode which absorbs and desorbs lithium ions;
   a negative electrode which absorbs and desorbs lithium metal;
   a lithium alloy or lithium ions; and
   the non-aqueous electrolyte solution as defined in claim 1.

6. The non-aqueous electrolyte solution according to claim 1, wherein the lithium salt (A) is included in an amount of from 0.5 to 2.0 mol per 1 L of the solvent (B).

7. The non-aqueous electrolyte solution according to claim 6, wherein the hydrofluoroether (b1) is included in an amount of from 10 to 15 vol % based on the total amount of the solvent (B).

8. The non-aqueous electrolyte solution according to claim 1, wherein the carbonate solvent (b2) comprises at least one cyclic carbonate and at least one chain carbonate,
the at least one cyclic carbonate is selected from the group consisting of propylene carbonate, ethylene carbonate, butylene carbonate, 4-chloro-1,3-dioxolan-2-one, 4-trifluoromethyl-1,3-dioxolan-2-one, fluoroethylene carbonate, vinylene carbonate and dimethylvinylene carbonate, and
the at least one chain carbonate is selected from the group consisting of dimethyl carbonate, diethyl carbonate, methyl ethyl carbonate, di-n-propyl carbonate, methyl-n-propyl carbonate, ethyl-n-propyl carbonate, methyl isopropyl carbonate, ethyl-n-propyl carbonate, ethyl isopropyl carbonate, di-n-propyl carbonate, diisopropyl carbonate and 3-fluoropropyl methyl carbonate.

9. The non-aqueous electrolyte solution according to claim 8, wherein the at least one cyclic carbonate is selected from the group consisting of ethylene carbonate, propylene carbonate, fluoroethylene carbonate and vinylene carbonate, and
the at least one chain carbonate is selected from the group consisting of dimethyl carbonate, diethyl carbonate and methyl ethyl carbonate.

10. The non-aqueous electrolyte solution according to claim 9, wherein a volume ratio of the chain carbonate to the cyclic carbonate is 1:10 to 10:1.

11. The non-aqueous electrolyte solution according to claim 1, wherein the lithium salt (A) is included in an amount of from 0.5 to 2.0 mol per 1 L of the solvent (B).

12. The non-aqueous electrolyte solution according to claim 1, wherein the hydrofluoroether (b1) is included in an amount of from 10 to 25 vol % based on the total amount of the solvent (B).

* * * * *